US008599834B2

(12) United States Patent
Potts et al.

(10) Patent No.: US 8,599,834 B2
(45) Date of Patent: Dec. 3, 2013

(54) SYSTEMS, METHODS, AND COMPUTER PROGRAM PRODUCTS FOR PROVIDING A MANUAL RING-DOWN COMMUNICATION LINE USING SESSION INITIATION PROTOCOL

(75) Inventors: Timothy Potts, East Haven, CT (US); Leonidas P. Papadopoulos, Ridgefield, CT (US); Rajnish Jain, Fairfield, CT (US)

(73) Assignee: IPC Systems, Inc., Jersey City, NJ (US)

( * ) Notice: Subject to any disclaimer, the term of this patent is extended or adjusted under 35 U.S.C. 154(b) by 885 days.

(21) Appl. No.: 12/569,494

(22) Filed: Sep. 29, 2009

(65) Prior Publication Data
US 2011/0075653 A1 Mar. 31, 2011

(51) Int. Cl.
*H04L 12/66* (2006.01)

(52) U.S. Cl.
USPC .......................................................... 370/352

(58) Field of Classification Search
USPC .......................................................... 370/352
See application file for complete search history.

(56) References Cited

U.S. PATENT DOCUMENTS

| 5,535,204 | A | 7/1996 | Li | |
|---|---|---|---|---|
| 7,002,912 | B2 * | 2/2006 | Wengrovitz | 370/230 |
| 7,031,280 | B2 * | 4/2006 | Segal | 370/331 |
| 7,554,927 | B2 * | 6/2009 | Hanna et al. | 370/252 |
| 7,571,238 | B1 | 8/2009 | Reeves et al. | |
| 7,856,470 | B2 * | 12/2010 | Raghav et al. | 709/204 |
| 8,103,215 | B2 | 1/2012 | Rek | |
| 2003/0097447 | A1 * | 5/2003 | Johnston | 709/227 |
| 2003/0161448 | A1 * | 8/2003 | Parolkar et al. | 379/88.17 |
| 2004/0086102 | A1 | 5/2004 | McMurry et al. | |
| 2005/0041617 | A1 | 2/2005 | Huotari et al. | |
| 2005/0141689 | A1 | 6/2005 | Wengrovitz | |
| 2005/0254510 | A1 | 11/2005 | Oja et al. | 370/431 |

(Continued)

FOREIGN PATENT DOCUMENTS

EP 2 252 040 A1 11/2010
WO WO 2005036857 A1 * 4/2005

OTHER PUBLICATIONS

Notification Concerning Transmittal of International Preliminary Report on Patentability and International Preliminary Report on Patentability, Int'l Patent Appln. No. PCT/US2010/045888, Apr. 12, 2012.

(Continued)

*Primary Examiner* — Asad Nawaz
*Assistant Examiner* — Syed S Ali
(74) *Attorney, Agent, or Firm* — Fitzpatrick, Cella, Harper & Scinto

(57) ABSTRACT

Systems, methods, and computer program products are provided for manual ring-down communication using Session Initiation Protocol (SIP). A first SIP user agent transmits a message to a second SIP user agent over an Internet Protocol (IP) network to establish a SIP session. The first SIP user agent determines that a signal key associated with a first communication device has been selected and transmits, to the second SIP user agent over the IP network, a start event message to cause a second communication device to activate an alert. The first SIP user agent determines that the signal key has been released and transmits over the IP network an end event message to deactivate the alert. The first SIP user agent transmits, to the second SIP user agent over the IP network, one or more subsequent INVITE messages at a predetermined repetition rate to refresh the SIP session.

15 Claims, 6 Drawing Sheets

(56) References Cited

U.S. PATENT DOCUMENTS

| | | | |
|---|---|---|---|
| 2006/0026288 A1* | 2/2006 | Acharya et al. | 709/227 |
| 2006/0056392 A1* | 3/2006 | Wang | 370/352 |
| 2006/0072546 A1 | 4/2006 | Chen | |
| 2006/0078103 A1 | 4/2006 | Light et al. | |
| 2006/0211455 A1 | 9/2006 | Choi | |
| 2006/0221943 A1* | 10/2006 | Aborn et al. | 370/356 |
| 2006/0234723 A1* | 10/2006 | Pedersen | 455/456.1 |
| 2006/0239251 A1* | 10/2006 | Bennett et al. | 370/352 |
| 2006/0245418 A1 | 11/2006 | Kucmerowski et al. | |
| 2006/0253698 A1 | 11/2006 | Mate et al. | |
| 2006/0294112 A1* | 12/2006 | Mandato et al. | 707/100 |
| 2007/0064896 A1* | 3/2007 | Chang et al. | 379/156 |
| 2007/0171898 A1 | 7/2007 | Salva | |
| 2007/0177602 A1 | 8/2007 | Pichelin et al. | |
| 2008/0043722 A1 | 2/2008 | Chuang et al. | |
| 2008/0095143 A1* | 4/2008 | Lai | 370/352 |
| 2008/0235381 A1 | 9/2008 | Tanizawa et al. | |
| 2008/0259909 A1* | 10/2008 | Runeson et al. | 370/352 |
| 2009/0022145 A1 | 1/2009 | Bakshi et al. | |
| 2009/0154468 A1 | 6/2009 | Donovan | |
| 2009/0285204 A1 | 11/2009 | Gallant et al. | |
| 2009/0319657 A1* | 12/2009 | Yang et al. | 709/224 |
| 2010/0157980 A1* | 6/2010 | Ellsworth et al. | 370/352 |
| 2010/0216502 A1* | 8/2010 | Hardin | 455/518 |
| 2011/0019620 A1* | 1/2011 | Wang | 370/328 |
| 2011/0093542 A1* | 4/2011 | Lau et al. | 709/206 |
| 2011/0206040 A1 | 8/2011 | Potts et al. | |
| 2011/0231558 A1 | 9/2011 | Holm | |
| 2012/0076002 A1 | 3/2012 | Ramsayer et al. | |
| 2012/0157059 A1* | 6/2012 | Raju et al. | 455/411 |
| 2012/0263175 A1* | 10/2012 | Wang | 370/352 |

OTHER PUBLICATIONS

Rosenberg et al., "SIP: Session Initiation Protocol" RFC 3261, The Internet Society, Jun. 2002.

Schulzrinne et al., "RTP: A Transport Protocol for Real-Time Applications" RFC 3550, The Internet Society, Jul. 2003.

Donovan et al., "Session Timers in the Session Initiation Protocol (SIP)" RFC 4028, The Internet Society, Apr. 2005.

Handley et al., "Session Description Protocol" RFC 4566, The Internet Society, Jul. 2006.

Schulzrinne et al., "RTP Payload for DTMF Digits, Telephony Tones, and Telephony Signals" RFC 4733, The IETF Trust, Dec. 2006.

Johansson et al., "Support for Reduced-Size Real-Time Transport Control Protocol (RTCP): Opportunities and Consequences" RFC 5506, The IETF Trust, Apr. 2009.

Burger et al., "Session Initiation Protocol (SIP) Info Method and Package Framework", The IETF Trust, Jul. 2009.

Hatala et al., "Voice over Frame Relay Implementation Agreement" FRF.11.1, Frame Relay Forum, Dec. 1998.

Int'l Search Report and Written Opinion of the Int'l Searching Authority, PCT/US10/45888, Oct. 12, 2010.

* cited by examiner

SYSTEMS, METHODS, AND COMPUTER PROGRAM PRODUCTS FOR PROVIDING A MANUAL RING-DOWN COMMUNICATION LINE USING SESSION INITIATION PROTOCOL

BACKGROUND OF THE INVENTION

1. Field of the Invention

The present invention generally relates to telecommunication systems, and more particularly to systems, methods, and computer program products for providing a manual ring-down communication line using the Session Initiation Protocol ("SIP").

2. Description of the Related Art

A manual ring-down ("MRD") private line is a communication line commonly used for two parties to maintain a continuous full-duplex communication channel with each other. A typical MRD private line communication device provides a user with the ability to manually signal the communication device on the other side of the line. Upon receiving the signal, the signaled communication device notifies its user audibly and/or visually that the user on the other end of the line wishes to communicate.

MRD private lines date back to a time period when telephones were purely analog devices, and the MRD private line was implemented using a physical copper wire connecting the two communication devices. Because the MRD private line typically was implemented using a fixed physical connection, a dedicated communication path was created through which users could communicate with each other at any time by, for example, picking up a telephone handset and keying a signaling button An alternative to a MRD private line communication device is an automatic ring-down (ARD) private line communication device, which enables its user to automatically signal the communication device on the other side of the line by, for example, merely picking up a telephone handset.

Typical users of manual and automatic ring-down private lines make large volumes of calls from and to fixed locations and require continuous and uninterrupted lines of communication between those locations. Examples of such users are trading floor environments, financial firms, emergency services, and the like. Audio communication in trading floor environments is typically achieved utilizing specialized hardware and software turret switching systems. A turret switching system is a specialized telephony switching system that allows a relatively small number of users to access a large number of external lines and provides enhanced communication features such as hoot-n-holler, push-to-talk, intercom, video and large-scale conferencing.

Users interface with a turret switching system through a trading turret device, which can be implemented in dedicated hardware (sometimes referred to as a "hard" turret) or in a general-purpose computer (sometimes referred to as a "soft" turret). A hard turret is a phone-like desktop device with multiple handsets, external microphones, speakers and buttons. A soft turret is a software application that runs on a trader's desktop personal computer ("PC") or on a mobile computer such as a Personal Digital Assistant ("PDA"). A soft turret application may be controlled using the native control interface that the computer provides such as a touch screen, stylus, click wheel, or mouse and keyboard. In addition to rendering a graphical image of the turret on the PC screen, the soft turret application may also provide voice, instant messaging and presence features.

With the advent of Voice over Internet Protocol ("VoIP"), users have begun to communicate over Internet Protocol ("IP") networks, for example, using telephones implemented in dedicated hardware, or telephones implemented on general purpose computer, which are sometimes referred to as hard telephones and soft telephones, respectively. Supporting MRD functionality in the IP realm, however, necessarily requires customizations to provide, for example, the same persistent connections and signaling.

BRIEF DESCRIPTION

The example embodiments described herein provide systems, methods, and computer program products for implementing manual ring-down communication using SIP. SIP is an application-layer control (i.e., signaling) protocol for creating, modifying, and terminating sessions such as Internet telephony calls with one or more participants and is defined in RFC-3261. A first SIP user agent transmits an INVITE message to a second SIP user agent over an IP network to establish a SIP MRD session. The first SIP user agent determines that a signal key associated with a first communication device has been selected. The first SIP user agent transmits a start event message to the second SIP user agent over the IP network to cause a second communication device to activate an alert. The first SIP user agent determines that the signal key associated with the first communication device has been released. The first SIP user agent transmits an end event message to the second SIP user agent over the IP network to cause the second communication device to deactivate the alert. The first SIP user agent transmits, to the second SIP user agent over the IP network, one or more subsequent RE-INVITE messages at a predetermined repetition rate to detect the liveliness of the second SIP user agent.

In another aspect, a method of negotiating a SIP MRD session establisher is provided. A first SIP user agent transmits, to a second SIP user agent over an IP network, an OPTIONS message to request designation of an MRD session establisher. The OPTIONS message includes an identifier of the first SIP user agent. The first SIP user agent receives, from the second SIP user agent over the IP network, a 200 OK message accepting designation of the first SIP user agent as the session establisher. Should the two SIP user agents send the OPTIONS message at the same time, thus causing a glare condition due to messages crossing on the wire, the SIP user agent with the numerically higher IP address will be chosen as the establisher. Both user agents know each other's IP address through the SIP 'Contact' header field within the OPTIONS message.

In another aspect, a method of re-establishing a failed SIP session is provided. A first SIP user agent receives, over an IP network, a request timeout message indicating that a SIP session with a second SIP user agent has failed. The first SIP user agent initiates a session establish timer. The first SIP user agent transmits, to the second SIP user agent over the IP network, an INVITE message, in response to the session establish timer expiring. The first SIP user agent repeats above process until a 200 OK message is received from the second SIP user agent.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings in which like reference numbers indicate identical or functionally similar elements.

DETAILED DESCRIPTION

The example embodiments of the invention presented herein are directed to systems, methods, and computer program products for providing a manual ring-down communication line using SIP, which are now described herein in terms of an example communication system. The communication system can be implemented, for example, in financial, security/law enforcement, utilities, healthcare, and customer support (e.g., contact centers) environments.

Figure 1:
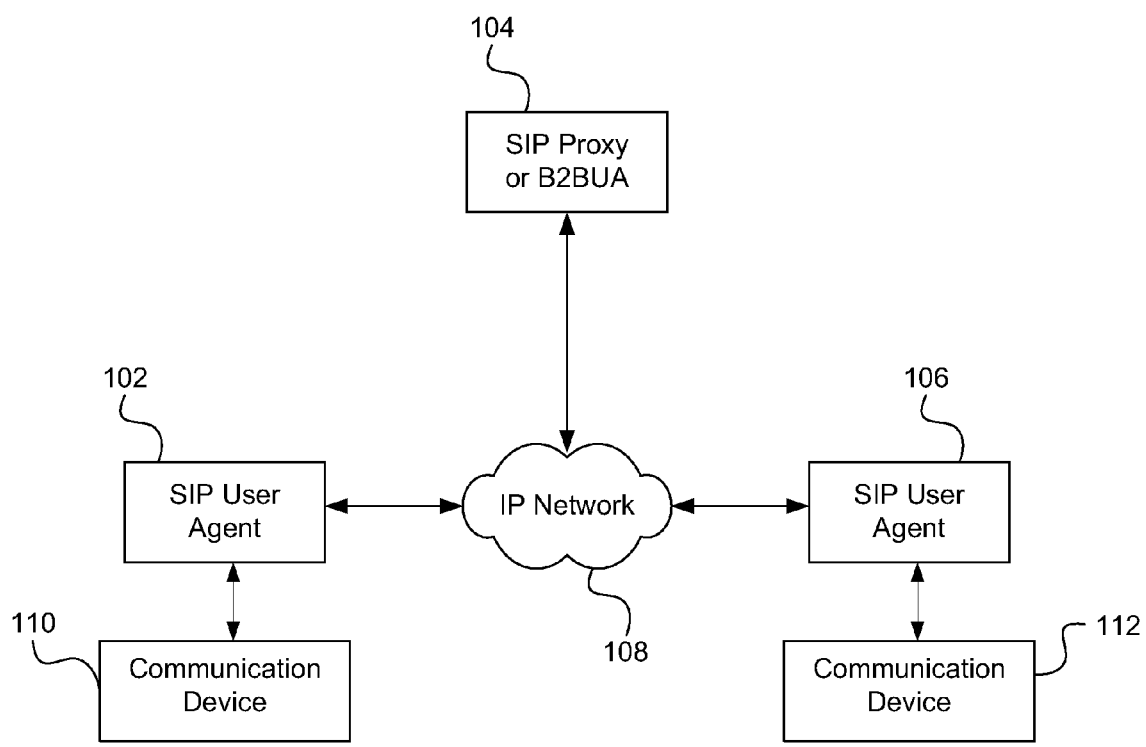
FIG. 1 depicts a block diagram of an example communication system in accordance with an embodiment of the present invention.

FIG. 1 depicts a block diagram of an example communication system 100 in accordance with an embodiment of the present invention. As shown in FIG. 1, communication system 100 includes communication devices 110 and 112. The term "communication device," as used herein, generally refers to any hardware and/or software-implemented electronic device having a user interface enabling a user to connect to a network to communicate audibly and/or visually with other communication devices. Examples of communication devices 110 and 112 include a hard turret, a soft turret, a hard telephone, a soft telephone, a mobile telephone, a PDA, a general purpose PC, and the like.

As shown in FIG. 1, communication devices 110 and 112 are communicatively coupled to SIP user agent 102 and SIP user agent 106, respectively, over, for example, a network or a proprietary communication line (not shown). Generally, SIP user agents 102 and 106 are logical network end-points used to create and/or receive SIP messages and manage SIP sessions.

Although FIG. 1 shows SIP user agents 102 and 106 as being separate from communication devices 110 and 112, embodiments where SIP user agents 102 and 106 are included as part of communication devices 110 and 112, respectively, are contemplated and are within the scope of the present invention.

SIP user agent 102 and SIP user agent 106 are each communicatively coupled with one or more SIP proxies or back-to-back user agents (B2BUA) 104 through an IP network 108, through which users can communicate using communication devices 110 and 112. SIP proxy/B2BUA 104 manages messaging by caching and notifying the states of communication devices 110 and 112 in system 100. SIP proxy/B2BUA 104 also processes and stores SIP registrations, which are uploaded by users of SIP user agents 102 and 106 indicating their respective current locations. Although system 100 includes SIP proxy/B2BUA 104, these components are optional. Embodiments where SIP user agent 102 and 106 communicate directly are within the scope of the present invention.

Although system 100 only shows two SIP user agents and communication devices, embodiments including more than two SIP user agents and communication devices sharing a SIP MRD session are contemplated and are within the scope of the present invention. For example, if three or more SIP user agents and communication devices are included in system 100, party-line communication is possible. System 100 may also include additional SIP user agents, which are configured to function as redundant backups in the event of a SIP user agent malfunction. Similarly, system 100 may include additional communication devices, which are configured to function as redundant backups in the event of a communication device malfunction.

SIP is an application-layer control (i.e., signaling) protocol for creating, modifying, and terminating sessions, such as Internet telephony calls, with one or more participants and is defined in RFC-3261, "SIP: Session Initiation Protocol." SIP-based communication architectures provide the ability to signal and communicate between telephony systems in collaboration with other protocols such as Session Description Protocol ("SDP") and Real-Time Protocol ("RTP"). SDP describes streaming media initialization parameters in an ASCII string and multimedia communication sessions for the purposes of session announcement, session invitation, and parameter negotiation. SDP is defined in RFC-4566, "SDP: Session Description Protocol." RTP is a standardized packet format for delivering audio and/or video data over IP networks and is defined by RFC-3550, "RTP: A Transport Protocol for Real-Time Applications" which has been updated by RFC-5506, "Support for Reduced-Size Real-Time Transport Control Protocol (RTCP): Opportunities and Consequences." RFC-3261, RFC-4566, RFC-3350, and RFC-5506 are hereby incorporated by reference in their entirety.

In an example embodiment, SIP user agents 102 and 106 use RTP to carry voice communication services through the IP network 108. SIP user agents 102, 106, and SIP proxy/B2BUA 104 use SIP to provide signaling functionality over the IP network 108 and to create, modify, and terminate RTP sessions such as VoIP calls.

Figure 2:
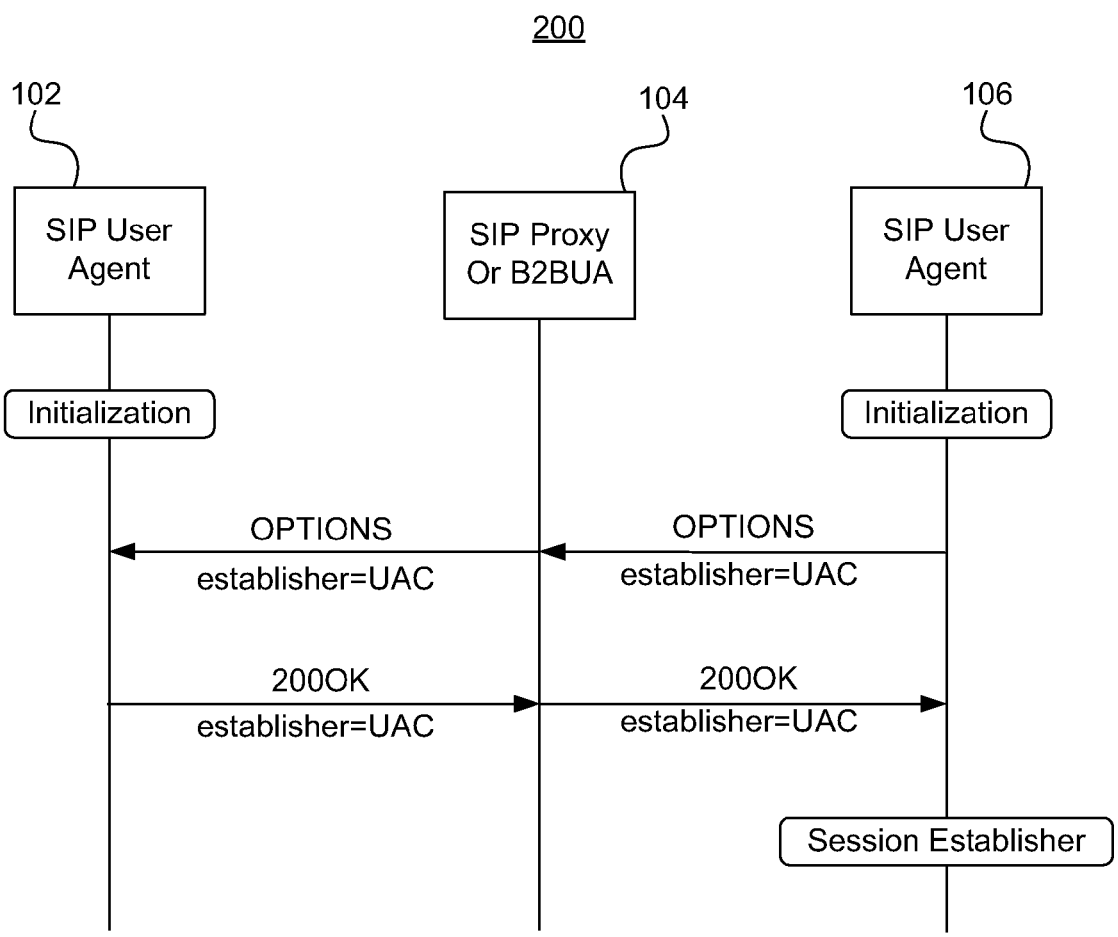
FIG. 2 depicts a sequence diagram for dynamically discovering a session establisher.

FIG. 2 depicts a sequence diagram 200 for dynamically discovering which of the SIP user agents 102 and 106 is to act as a session establisher, which is the entity responsible for initially generating a SIP session and then re-attempting to establish the SIP session until it is successfully established. A session establisher may interchangeably be referred to as a SIP session establisher. Similarly, a session may interchangeably be referred to as a SIP session.

As shown in FIG. 2, once SIP user agents 102 and 106 are initialized, SIP user agent 106 requests to be designated as the session establisher by transmitting an OPTIONS message to SIP user agent 102. The OPTIONS message includes a value indicating that a particular user agent requests to be designated as the session establisher and an identifier value of the particular user agent, in this example SIP user agent 106. The indication may be a text string such as "establisher=uac" or "establisher=uas". The value "uac" implies that the SIP user agent that originated the OPTIONS message intends to be the session establisher. The value "uas" implies that the SIP user agent that originated the OPTIONS message intends the other SIP user agent to be the session establisher. This text string may be appended to the existing 'Contact' header field in the SIP OPTIONS message or may be carried in a header field of its own.

Once SIP user agent 106 transmits the OPTIONS message to SIP user agent 102, SIP user agent 106 waits for a response. Upon receiving the OPTIONS message from SIP user agent 106, SIP user agent 102 responds by transmitting a SIP 200 "OK" message to SIP user agent 106, as shown in FIG. 2. Upon SIP user agent 106 receiving the SIP 200 OK message, SIP user agent 106 is designated the session establisher. The SIP 200 OK messages also carry the "establisher" parameter to indicate what the other SIP user agent has agreed upon with respect to which SIP user agent performs the establisher role.

Although FIG. 2 shows SIP user agent 106 as the session establisher, embodiments where SIP user agent 102 is the session establisher also are contemplated and are within the scope of the present invention. In fact, the discovery of the session establisher is dynamic in that either SIP user agent 102 or SIP user agent 106 may request to be designated as session establisher. Dynamic discovery of the session establisher enables any end-point to determine which end-point should attempt to establish the session. Both ends of the private line, that is, both SIP user agent 102 and SIP user agent 106, are configured with each other's address of record ("AOR") and can initiate calls in either direction.

Dynamic discovery of the session establisher also assists in preventing multiple end-points, in this example SIP user agents 102 and 106, from simultaneously trying to establish the session, because an end-point will not attempt to establish a session until the end-point has been designated the session establisher. In the event that both SIP user agent 102 and 106 simultaneously request to be designated session establisher, a predetermined rule can be used to determine which of SIP user agent 102 and 106 will actually be designated the session establisher. For example, the rule may be that the user agent associated with the higher value IP address is designated the session establisher. Dynamic discovery of the session establisher thus also reduces the potential for race conditions, the complexity of the communication system 100, and the potential for human errors in configuration.

In an alternative embodiment, the session establisher can be determined by using configuration parameters or manually through a user interface (not shown).

Figure 3:
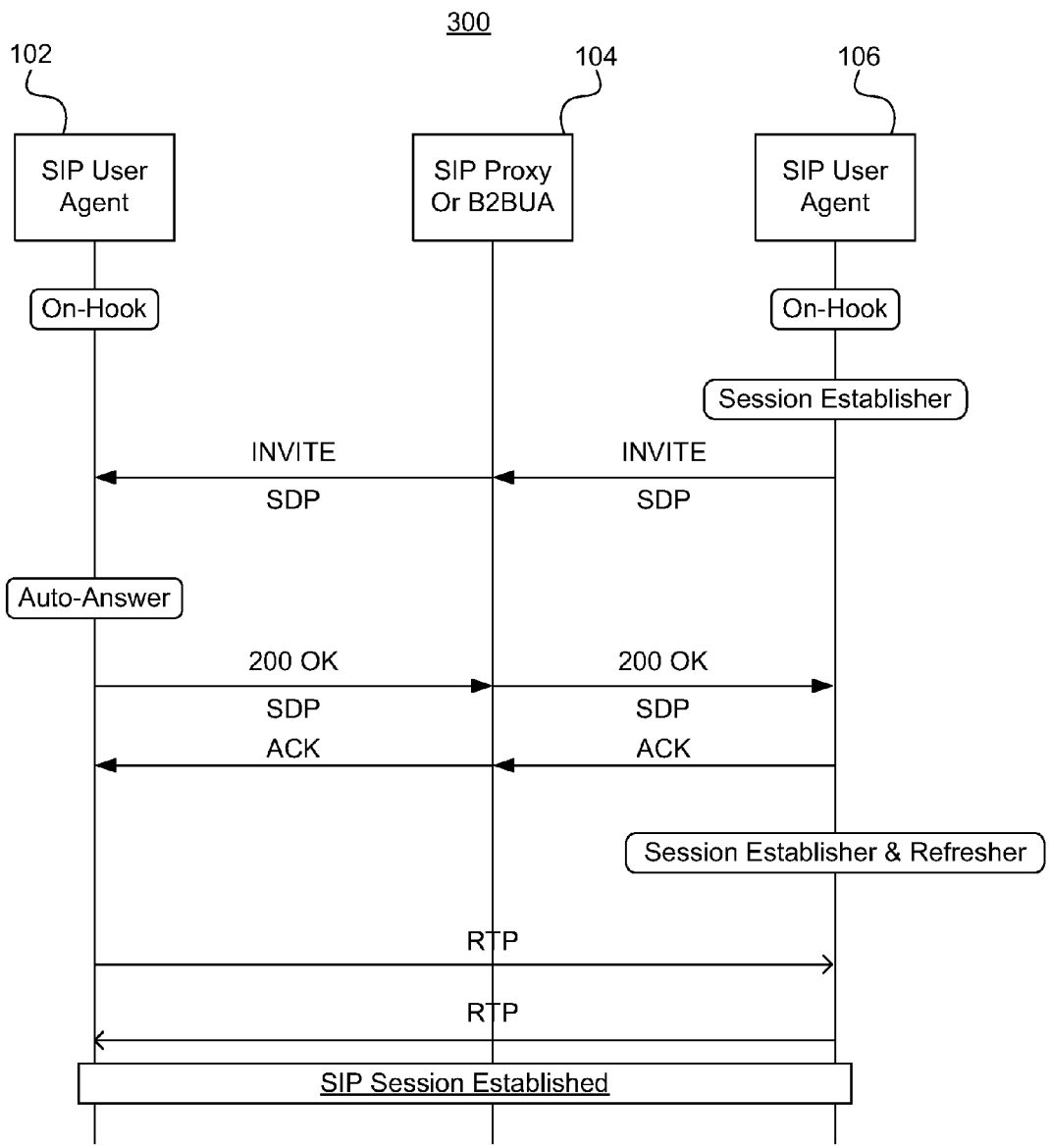
FIG. 3 depicts an example sequence diagram for establishing a session.

FIG. 3 depicts an example sequence diagram 300 for establishing a session. As mentioned above, establishment of a session is not attempted until an end-point has been designated as the session establisher. In this example, SIP user agent 106 has previously been designated as the session establisher. The establishment of the SIP session is attempted regardless of the on-hook/off-hook state of SIP user agents 102 and/or 106. In this way, the communication line that results from a successful session establishment functions as if it is an "always on" connection. For example, a user of communication device 110 may exchange voice communications with a user of communication device 112 without having to dial a number associated with communication device 112; the SIP session may have been previously established before either user picks up their hard or soft telephone, as the case may be. This automatic session establishment allows users to speak to each other without requiring any action by them and is the basis for private line functionality.

As shown in FIG. 3, SIP user agent 106, as the session establisher, transmits an INVITE message over IP network 108 to SIP proxy/B2BUA 104, which in turn forwards the INVITE message to SIP user agent 102. Alternatively, as mentioned above, SIP user agent 106 may transmit the INVITE message over IP network 108 directly to SIP user agent 102. The INVITE message contains a number of header fields, which are named attributes that provide additional information about a message. The attributes present in the INVITE message can include a unique identifier for the call, the destination address, the source address, and/or information about the type of session that the session establisher is attempting to establish. The body of the INVITE message contains a description of the session, encoded in some other protocol format, such as SDP, which is mentioned above in further detail. When SIP user agent 102 receives the INVITE message, it automatically answers the call. SIP user agent 102 responds by transmitting a SIP 200 OK message to SIP user agent 106 via IP network 108 and optionally via SIP proxy/B2BUA 104. At this point the session is established.

Once the session has been established, it is determined which end-point is to be designated as a session refresher, which is used to periodically refresh a corresponding SIP session. In an example embodiment, the session refresher is determined according to RFC-4028, "Session Timers in the Session Initiation Protocol (SIP)," which is hereby incorporated by reference in its entirety. The signaling mechanism is negotiated during session establishment in accordance with the "Session Initiation Protocol (SIP) INFO Method and Package Framework," which is hereby incorporated by reference in its entirety. In this example, SIP user agent 106 functions as both the session establisher and the session refresher. SIP user agent 106, as session establisher, also negotiates with the other user agent(s) as to which specific signaling mechanism is to be used throughout the session. In this example, an RTP events signaling method is negotiated as the signaling mechanism to be used between SIP user agents 102 and 106. An RTP payload type may be encoded as an existing RFC-4733 event. Alternatively, an extension to RFC-4733 or a new CODEC type may be defined. Although in this example RTP events are negotiated to be used as the signaling mechanism, other suitable signaling mechanisms, such as a SIP INFO mechanism, are contemplated and are within the scope of the present invention.

An example SIP MRD event package is defined as follows. A package name for SIP MRD Info-Event is "sip-mrd". Below are examples of SIP headers where the package name (or token name) is carried:

Info-Package: sip-mrd
Recv-Info: sip-mrd.

A Content-Type header is specified as "application/sip-mrd". An Augmented Backus-Naur Form (ABNF) for a SIP MRD Info-Event is defined as follows:

sip-mrd-relay-body=signal-line CRLF duration-line
signal-line="Signal" EQUAL SP ("start"/"stop")
duration-line="Duration" EQUAL SP msecs
msecs=1*4(DIGIT); 100-5000 millisecs.

Figure 4:
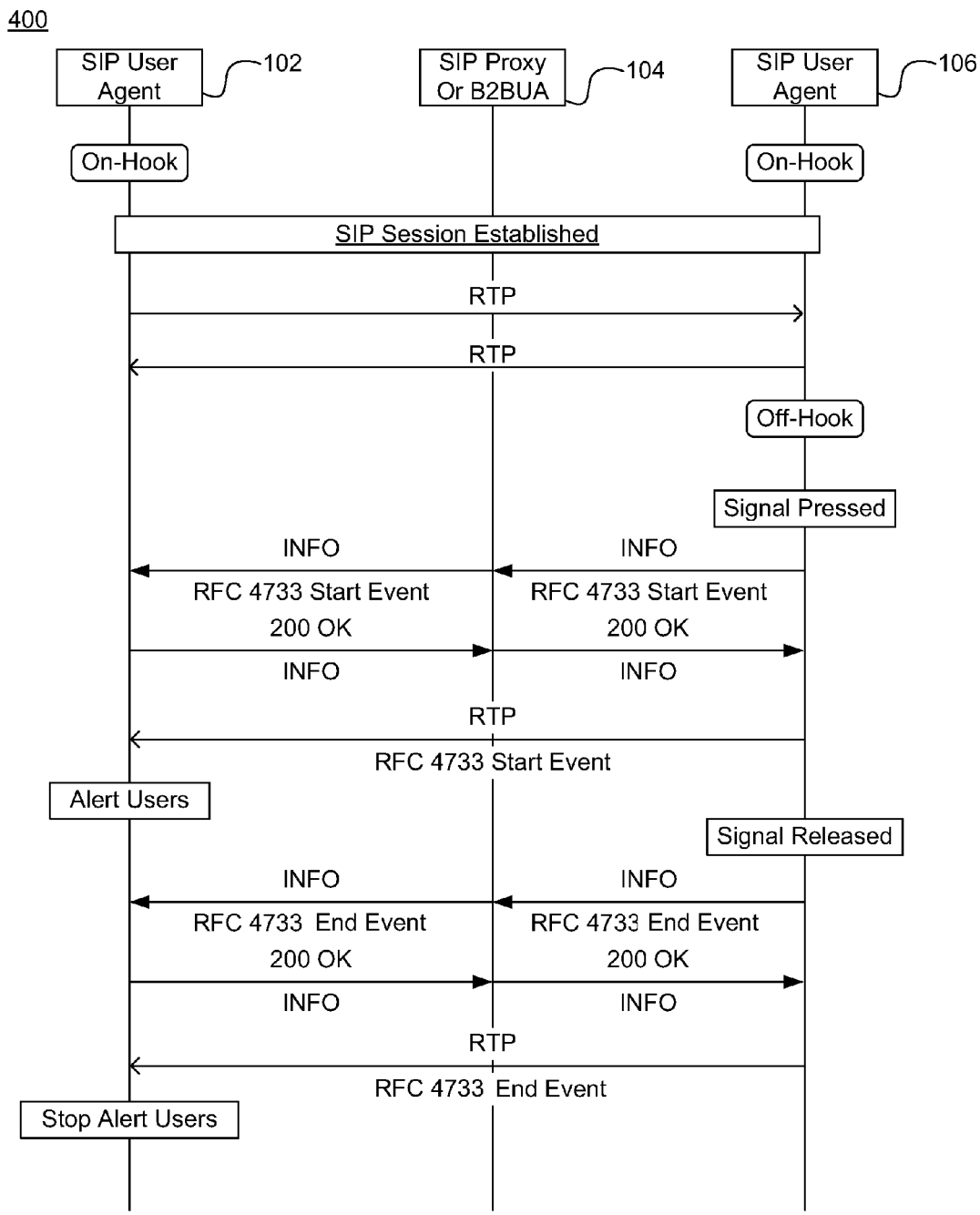
FIG. 4 depicts an example sequence diagram of a mid-session MRD signaling mechanism.

FIG. 4 depicts an example sequence diagram 400 of a signaling mechanism in accordance with an embodiment of the present invention. In this example, the SIP session has been established, and SIP user agent 106 has been designated as both the session establisher and the session refresher. While FIG. 4 shows both the SIP INFO mechanism and the RTP events mechanism being used as signaling mechanisms, preferably only one of these is used as the signaling mechanism.

As shown in FIG. 4, SIP user agents 102 and 106 communicate using RTP messaging. The user changes the state of communication device 112 to off-hook, for example by picking up the hard or soft telephone, as the case may be, which in this example gives rise to no change in the SIP session or the RTP messages. The user then presses a signal key (or button) on communication device 112 to signal the user of communication device 110 of a desire to communicate. Pressing the signal key causes different messages to be sent depending on which signaling mechanism was negotiated for the SIP session. If the SIP MRD event package is supported on both sides, the signaling events are sent using the SIP INFO method. If the RTP SIP MRD CODECs are supported on both sides, then this method is used. If both the SIP MRD event package and the RTP SIP MRD CODECs are supported, then both are used. Both the RTP events signaling mechanism and the SIP INFO signaling mechanism convey a "signal begin" event and a "signal end" event using events defined, for example, in RFC-4733, "RTP Payload for DTMF Digits, Telephony Tones, and Telephony Signals," which is hereby incorporated by reference in its entirety. If the SIP INFO method was negotiated as the signaling mechanism, then pressing the signal key causes an INFO start event message to be sent to SIP user agent 102 over IP network 108, optionally via SIP proxy/B2BUA 104. If the RTP events mechanism was negotiated as the signaling mechanism, then pressing the signal key causes an RTP start event message to be sent to SIP user agent 102 over IP network 108, optionally via SIP proxy/B2BUA 104. Configuration data included in the messages indicates the start and end events.

The INFO message and the RTP message each include RFC-4733 start signal event data, which causes SIP user agent 106 to signal SIP user agent 102, which in turn causes communication device 110 to present a visual and/or audible alert to its user. Particularly, the start signal event information, when received at SIP user agent 102, alerts the user of communication device 110 that the user on communication device 112 wishes to communicate. The alert may be, for instance, the ringing of a hard or soft telephone or the illumination of a light bulb fixed to the hard or soft telephone. Upon receipt of the RFC-4733 start signal event, SIP user agent 102 responds by transmitting an SIP 200 OK message to SIP user agent 106 over IP network 108, optionally via SIP proxy/B2BUA 104.

The user of communications device 112 then releases the signal key. Releasing the signal key also causes different messages to be sent depending on which signaling mechanism was negotiated for the SIP session. If the SIP INFO method was negotiated as the signaling mechanism, then releasing the signal key causes an INFO message, including an RFC-4733 end signal event, to be sent to SIP user agent 102 over IP network 108, optionally via SIP proxy/B2BUA 104. SIP user agent 102 responds by transmitting a SIP 200 OK message to SIP user agent 106 over IP network 108, optionally via SIP proxy/B2BUA 104. If the RTP events method was negotiated as the signaling mechanism, then releasing the signal key causes an RTP end event message to be sent to SIP user agent 102 over IP network 108, optionally via SIP proxy/B2BUA 104, which, in turn causes the alerting of SIP user agent 102 to cease. SIP user agent 102 responds by transmitting a SIP 200 OK message to SIP user agent 106 over IP network 108, optionally via SIP proxy/B2BUA 104.

In an alternative embodiment, automatic ring-down can be performed, instead of manual ring-down, such that the signaling occurs in response to the user changing the state of communication device 112 to off-hook; that is, signaling occurs without the user keying any button or clicking any icon. This is particularly useful in time-critical communication applications, such as those between financial brokers or emergency personnel, because it reduces the steps and time necessary to engage in communication.

In another alternative embodiment, one side of the private line, for instance the SIP user agent 102, does not support either the SIP INFO signaling mechanism or the RTP events signaling mechanism. In this case, signaling will not be sent in either direction and the communication line will function similar to a hoot-and-holler communication line.

Figure 5:
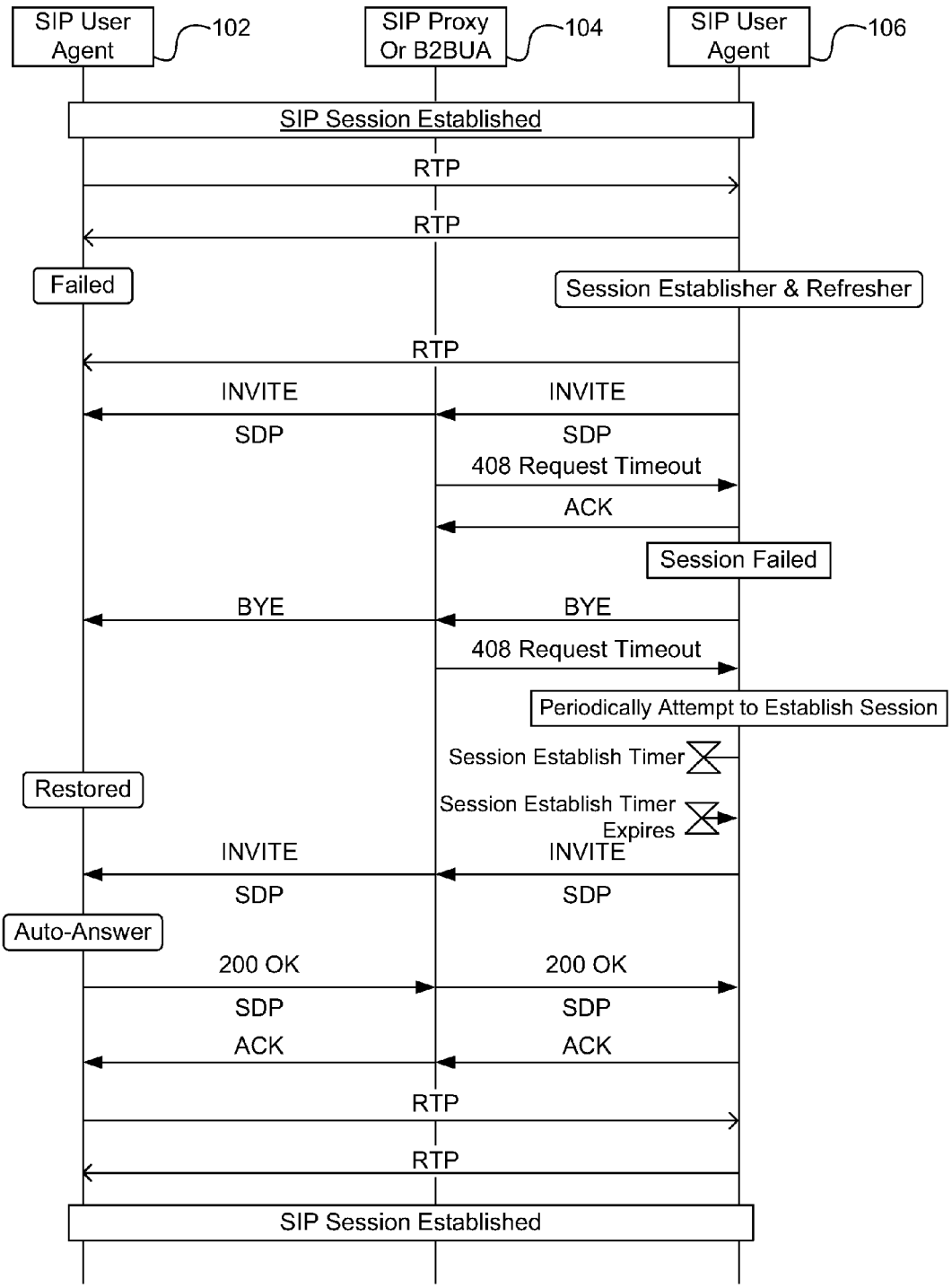
FIG. 5 depicts an example sequence diagram for re-establishing a session after a session failure.

FIG. 5 depicts an example sequence diagram 500 for re-establishing a session after the session has failed. A SIP session failure can occur in two ways: (1) by the isolated failure of an attempt to refresh the SIP session, or (2) by the failure of an attempt to refresh the SIP session in conjunction with RTP messages no longer being received by the SIP session refresher. In this example, SIP user agent 106 has been designated as the session establisher and the session refresher. As shown in FIG. 5, operation of SIP user agent 102 has failed. SIP user agent 106 attempts to refresh the session by transmitting an INVITE message to SIP user agent 102 over the IP network 108, optionally via SIP proxy/B2BUA 104. SIP user agent 102 fails to respond to the INVITE and, after a predetermined timeout period, SIP proxy/B2BUA 104 transmits to SIP user agent 106 a request timeout 408 message over IP network 108. SIP user agent 106 acknowledges the request timeout 408 message by transmitting an ACK message to SIP proxy/B2BUA 104 over IP network 108.

SIP user agent 106 then sends a BYE message to SIP user agent 102 over IP network 108, optionally via SIP proxy/B2BUA 104. SIP user agent 102 fails to respond to this message as well and, after a predetermined timeout period, SIP proxy/B2BUA 104 sends to SIP user agent 106 another request timeout 408 message. SIP user agent 106 begins to run a session establish timer. As shown in FIG. 4, at some point in time before the session establish timer expires, operation of SIP user agent 102 is restored. In response to the session establish timer expiring, SIP user agent 106 attempts to establish the session once again by transmitting another INVITE message to SIP user agent 102 over IP network 108, optionally via SIP proxy/B2BUA 104. This time, because operation of SIP user agent 102 has been restored, SIP user agent 102 responds by transmitting a SIP 200 OK message to SIP user agent 106 over IP network 108, optionally via SIP proxy/B2BUA 104. SIP user agent 106 acknowledges this by transmitting and ACK message to SIP user agent 102 over IP network 108, optionally via SIP proxy/B2BUA 104, indicating that the session has been re-established. SIP user agent 106 and SIP user agent 102 can then continue to communicate using RTP messages.

Referring back to FIG. 5, if the operation of SIP user agent 102 had not been restored prior to the session establish timer expiring, SIP user agent 106 would periodically attempt to re-establish the session, at a predetermined repetition rate, until re-establishment is successful or until a predetermined number of failed re-establishment attempts occurs. In this way, the manual ring-down communication line is self-healing. That is, SIP user agent 106 attempts to maintain a persistent private communication line with SIP user agent 102 for as long as possible without requiring human intervention, unless components are damaged and/or are malfunctioning.

The present invention (e.g., system 100, sequence diagrams 200, 300, 400, 500, or any part(s) or function(s) thereof) can be implemented using hardware, software or a combination thereof and can be implemented in one or more computer systems or other processing systems. However, the manipulations performed by the present invention were often referred to in terms, such as establishing or discovering, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 6:
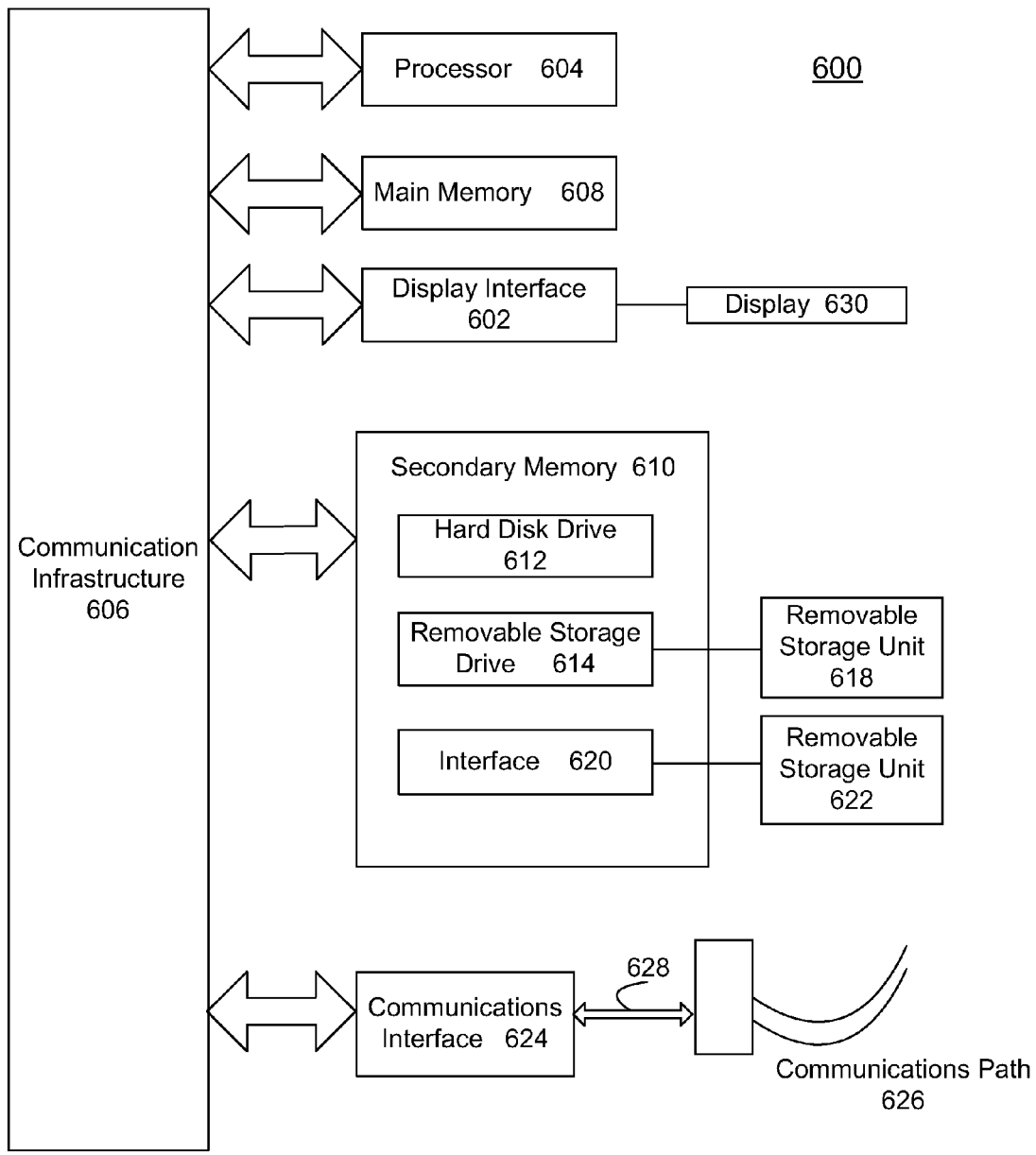
FIG. 6 depicts a block diagram of an exemplary computer system useful for implementing the present invention.

In fact, in one embodiment, the invention is directed toward one or more computer systems capable of carrying out the functionality described herein. An example of a computer system 600 is shown in FIG. 6.

Computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 can include other similar devices for allowing computer programs or other instructions to be loaded into computer system 600. Such devices can include, for example, a removable storage unit 622 and an interface 620. Examples of such can include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 can also include a communications interface 624. Communications interface 624 allows software and data to be transferred between computer system 600 and external devices. Examples of communications interface 624 can include a modem, a network interface (such as an Ethernet card), a communications port, a Personal Computer Memory Card International Association (PCMCIA) slot and card, etc. Software and data transferred via communications interface 624 are in the form of signals 628 which can be electronic, electromagnetic, optical or other signals capable of being received by communications interface 624. These signals 628 are provided to communications interface 624 via a communications path (e.g., channel) 626. This channel 626 carries signals 628 and can be implemented using wire or cable, fiber optics, a telephone line, a cellular link, a radio frequency (RF) link and other communications channels.

In this document, the terms "computer program medium," "computer-readable medium," and "computer-usable medium" are used to generally refer to media such as removable storage drive 614, a hard disk installed in hard disk drive 612, and/or signals 628. These computer program products provide software to computer system 600. The invention is directed to such computer program products.

Computer programs (also referred to as computer control logic) are stored in main memory 608 and/or secondary memory 610. Computer programs can also be received via communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software can be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it can be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for providing a manual ring-down communication line using Session Initiation Protocol (SIP), comprising the steps of:

transmitting, by a session establisher SIP user agent to a second SIP user agent over an Internet Protocol (IP) network, an INVITE message;

receiving, by the session establisher SIP user agent from the second SIP user agent, an acknowledgment message transmitted in response to the INVITE message, thereby establishing a private line SIP session, wherein the private line SIP session provides a manual ring-down communication line;

re-establishing, by the session establisher SIP user agent, the private line SIP session after a session failure;

determining, by the session establisher SIP user agent, that a signal key associated with a first communication device has been selected;

transmitting, by the session establisher SIP user agent to the second SIP user agent over the IP network, a start event message to cause a second communication device to activate an alert;

determining, by the session establisher SIP user agent, that the signal key associated with the first communication device has been released; and transmitting, by the session establisher SIP user agent to the second SIP user agent over the IP network, an end event message to cause the second communication device to deactivate the alert.

2. The method of claim 1, further comprising the step of transmitting, by the session establisher SIP user agent to the second SIP user agent over the IP network, a session establisher message requesting to be designated as the session establisher.

3. The method of claim 2, wherein the session establisher message is an OPTIONS message including an identifier of the session establisher SIP user agent, and wherein the method further comprises the step of:

receiving, by the session establisher SIP user agent from the second SIP user agent over the IP network, a 200 OK message accepting designation of the session establisher SIP user agent as the session establisher.

4. The method of claim 1, further comprising forwarding, by at least one of a SIP proxy and a back-to-back user agent (B2BUA), a message between the session establisher SIP user agent and the second SIP user agent over the IP network.

5. The method of claim 1, wherein the alert is at least one of an audible alert and a visual alert, and wherein the at least one of the audible alert and the visual alert are initiated by at least one of (i) the INVITE message and (ii) the signal key being selected by a user during the established SIP session.

6. A non-transitory computer-readable medium having stored thereon sequences of instructions, the sequences of instructions including instructions, which, when executed by a computer system, cause the computer system to:

transmit, by a session establisher Session Initiation Protocol (SIP) user agent to a second SIP user agent over an Internet Protocol (IP) network, an INVITE message;

receive, by the session establisher SIP user agent from the second SIP user agent, an acknowledgment message transmitted in response to the INVITE message, thereby establishing a private line SIP session, wherein the private line SIP session provides a manual ring-down communication line;

re-establish, by the session establisher SIP user agent, the private line SIP session after a session failure;

determine, by the session establisher SIP user agent, that a signal key associated with a first communication device has been selected;

transmit, by the session establisher SIP user agent to the second SIP user agent over the IP network, a start event message to cause a second communication device to activate an alert;

determine, by the session establisher SIP user agent, that the signal key associated with the first communication device has been released; and transmit, by the session establisher SIP user agent to the second SIP user agent over the IP network, an end event message to cause the second communication device to deactivate the alert.

7. The non-transitory computer-readable medium of claim 6, wherein the instructions, when executed by the computer system, further cause the computer system to transmit, by the session establisher SIP user agent to the second SIP user agent over the IP network, a session establisher message requesting to be designated as the session establisher.

8. The non-transitory computer-readable medium of claim 7, wherein the session establisher message is an OPTIONS message including an identifier of the session establisher SIP user agent, and wherein the instructions, when executed by the computer system, further cause the computer system to:

receive, by the session establisher SIP user agent from the second SIP user agent over the IP network, a 200 OK message accepting designation of the session establisher SIP user agent as the session establisher.

9. The non-transitory computer-readable medium of claim 6, wherein the instructions, when executed by the computer system, further cause the computer system to forward, by at least one of a SIP proxy and a back-to-back user agent (B2BUA), a message between the session establisher SIP user agent and the second SIP user agent over the IP network.

10. The non-transitory computer-readable medium of claim 6, wherein the alert is at least one of an audible alert and a visual alert, and wherein the at least one of the audible alert and the visual alert are initiated by at least one of (i) the INVITE message and (ii) the signal key being selected by a user during the established SIP session.

11. A manual ring-down private line communication system, the system comprising:

a first communication device communicatively coupled to an IP network by way of a session establisher Session Initiation Protocol (SIP) user agent, wherein the session establisher SIP user agent is configured to:

transmit, to a second SIP user agent over the IP network, an INVITE message, receive, from the second SIP user agent, an acknowledgment message transmitted in response to the INVITE message, thereby establishing a private line SIP session, wherein the private line SIP session provides a manual ring-down communication line, re-establish the private line SIP session after a session failure, determine that a signal key associated with a first communication device has been selected, transmit, to the second SIP user agent over the IP network, a start event message to cause a second communication device to activate an alert, determine that the signal key associated with the first communication device has been released, and transmit, to the second SIP user agent over the IP network, an end event message to cause the second communication device to deactivate the alert; and the second communication device communicatively coupled to the IP network by way of the second SIP user agent, wherein the second SIP user agent is configured to:

receive, over the IP network, the INVITE message and transmit an acknowledgment message in response to the INVITE message.

12. The system of claim 11, wherein the session establisher SIP user agent is further configure to transmit, to the second SIP user agent over the IP network, a session establisher message requesting to be designated as the session establisher.

13. The system of claim 12, wherein the session establisher message is an OPTIONS message including an identifier of the session establisher SIP user agent, and wherein the session establisher SIP user agent is further configured to receive, from the second SIP user agent over the IP network, a 200 OK message accepting designation of the session establisher SIP user agent as the session establisher.

14. The system of claim 11, further comprising at least one of a SIP proxy and a back-to-back user agent (B2BUA) configured to forward a message between the session establisher SIP user agent and the second SIP user agent over the IP network.

15. The system of claim 11, wherein the alert is at least one of an audible alert and a visual alert, and wherein the at least one of the audible alert and the visual alert are initiated by at least one of (i) the INVITE message and (ii) the signal key being selected by a user during the established SIP session.

* * * * *

UNITED STATES PATENT AND TRADEMARK OFFICE
CERTIFICATE OF CORRECTION

| | |
|---|---|
| PATENT NO. | : 8,599,834 B2 |
| APPLICATION NO. | : 12/569494 |
| DATED | : December 3, 2013 |
| INVENTOR(S) | : Potts et al. |

It is certified that error appears in the above-identified patent and that said Letters Patent is hereby corrected as shown below:

TITLE PAGE, ITEM [56] FOREIGN PATENT DOCUMENTS

"WO 2005036857 A1" should read --WO 2005/036857 A1--.

REFERENCES CITED, ITEM [56] OTHER PUBLICATIONS

"Transmittal of" should read --Transmittal of Copy of--.

IN THE SPECIFICATION

COLUMN 6

Line 11, "(SIP),"" should read --(SIP)",--.
Line 15, "Framework,"" should read --Framework",--.

COLUMN 7

Line 4, "Signals,"" should read --Signals",--.
Line 43, "ofSIP" should read --of SIP--.

COLUMN 8

Line 29, "transmitting and" should read --transmitting an--.

Signed and Sealed this
Twenty-third Day of December, 2014

Michelle K. Lee
*Deputy Director of the United States Patent and Trademark Office*

CERTIFICATE OF CORRECTION (continued)
U.S. Pat. No. 8,599,834 B2

IN THE CLAIMS

COLUMN 12, CLAIM 12

Line 52, "configure" should read --configured--.